Aug. 11, 1964  A. W. EHLERT  3,143,909
CUTTING DEVICE
Original Filed May 2, 1960

INVENTOR.
ARTHUR W. EHLERT
BY Walter N. Rodgers
atty

3,143,909
CUTTING DEVICE
Arthur W. Ehlert, Box 181, Acworth, Ga.
Continuation of application Ser. No. 26,342, May 2, 1960.
This application Mar. 11, 1963, Ser. No. 265,010
1 Claim. (Cl. 83—167)

This invention relates to cutting devices and more particularly to wire cutters adapted simultaneously to measure a plurality of strands of wire or other elements to be cut and to accumulate the cut items in an orderly and readily usable fashion.

This application is a continuation of my application Serial No. 26,342 filed May 2, 1960, now abandoned.

Wires for use in making floral wreaths, sprays, and the like, are customarily purchased by the florist in bundles, the wires being of a given generally uniform length. It usually is necessary to cut the individual strands of wire to desired shorter lengths in order to adapt the wires for floral use. Such cutting operations are customarily performed with hand shears capable of cutting only a single strand at a time. Obviously such a procedure is time consuming and inefficient and is particularly objectionable when the volume of work is abnormal for the florist.

A principal object of this invention is to provide a simple, efficient wire-cutting device which is adapted to measure and cut a plurality of wires or other similar elements in a single operation and which also is specially constructed to accumulate the cut wires in an orderly and readily usable fashion.

The invention in one form comprises a support base, a pair of relatively movable cutter elements supported by the base, collector means mounted on the base adjacent the cutter elements for simultaneously receiving a plurality of wires to be cut and for accumulating the wires after having been cut, and abutment means movably mounted on the collector means for determining the length of wire to be cut. According to a special feature of the invention a guide is provided having a guide surface arranged to control the movement of a movable one of the cutter elements to insure the proper positional relationship between the cutters during cutting operations.

Figure 1:
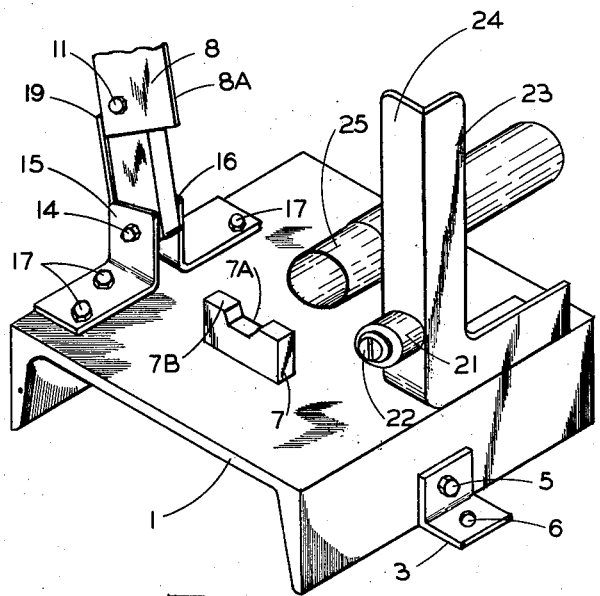
Figure 2:
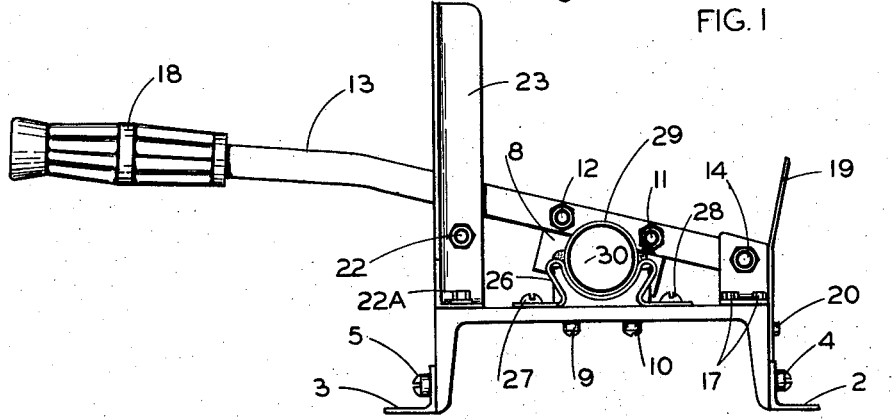
Figure 3:
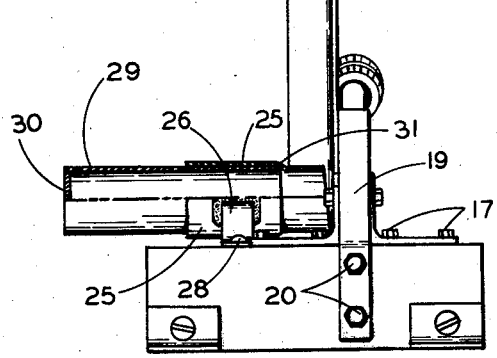

For a better understanding of the invention reference may be had to the following detailed description taken in conjunction with the accompanying drawing in which FIG. 1 is a perspective view of a wire cutter constructed according to the invention; FIG. 2 is a side view of the arrangement shown in FIG. 1; and in which FIG. 3 is an end view of the device depicted in FIGS. 1 and 2.

With reference to the drawings the numeral 1 designates a support base. If desired suitable feet 2 and 3 may be secured to the sides of the base 1 by screws 4 and 5 respectively. It will be understood that the cutter base 1 may be secured to a supporting bench or table by simply inserting a screw or bolt through openings formed in the feet, such for example as are designated in FIG. 1 by the numeral 6.

A pair of cutter elements are supported by the base 1 and in the drawings are designated by the numerals 7 and 8. Fixed cutter 7 is provided with a cutting edge 7A which preferably is bevelled to aid in performing a shearing action in known manner. Similarly the cutting edge 8A is bevelled. Fixed cutter 7 may be secured to base 1 in any suitable fashion such for example as by the screws 9 and 10 while the movable cutter 8 is secured by bolts 11 and 12 to manually operable blade supporting lever 13 which is pivotally mounted at 14 to a pair of L-shaped brackets 15 and 16 secured by suitable bolts 17 to the base 1. Preferably the lever 13 is provided with a hand grip device 18. For determining the limit of travel of the lever 13 in a counter-clockwise direction as viewed in FIG. 1, an abutment stop 19 is secured by screws 20 to base 1. From the description thus far it is apparent from FIG. 1 that clockwise swinging movement of cutter supporting arm 13 about its pivot 14 causes the cutting edge 8A of movable cutter 8 to move alongside the cutting edge 7A of fixed cutter element 7 and thereby to perform a shearing operation.

For the purpose of limiting the movement of the cutter 8 in its wire cutting direction of travel, a stop element 21 is affixed by bolt 22 to an L-shaped guide member 23. Thus when the lower portion of arm 13 engages the stop 21, downward movement of cutter 8 is arrested. For the purpose of rendering the stop 21 adjustable, an eccentric construction of bolt 22 or of sleeve 21 may be employed or, if desired, an eccentric sleeve may be mounted on bolt 22 and inside the stop 21.

For the purpose of guiding the movable cutter 8 into its proper positional relationship to the fixed cutter 7, the guiding surface 24 of the L-shaped guide 23 is arranged so that the upper part thereof is spaced somewhat away from the path of travel of the arm 13 while the lower part of the guiding surface 24 in the region immediately above the stop 21 is positioned so that the movable cutter 8 is disposed closely adjacent to the fixed cutter 7 when the blade approaches its lower limit of cutting movement. In this way a clean, efficient shearing action is assured according to one facet of the invention.

For the purpose of rendering the positional relation between the cutters 7 and 8 adjustable and thereby to insure optimum shearing action, the holes in the base of guide 23 which receive bolts 22A and the holes in brackets 15 and 16 which receive bolts 17 are oversize and preferably are elliptical in shape.

From FIG. 1 it may be observed that the cutting edge 7A of the fixed cutter 7 is indented somewhat from the edge 7B of the fixed cutter. As will become apparent the indented relationship of the cutting edge 7A in cooperation with the movable cutter 8 is effective to prevent the wires or other elements from creeping during a cutting operation and helps in the performance of a cutting operation on a plurality of wires during one swinging movement of the movable cutter 8.

In accordance with a main feature of the invention, collector means are provided for accumulating cut portions of wire. Such collector means is indicated in the drawings by the numeral 25. Collector 25 is secured by any suitable means to bracket 26 which in turn is affixed by screws 27 and 28 to base 1. Furthermore, collector 25 is of a hollow tubular construction and its axis is disposed generally transverse to the plane of swinging movement of the movable cutter 8 and generally coincident with the indented cutting edge 7A of the fixed cutter 7, the diameter of collector 25 preferably being somewhat greater than the length of cutting edge 7A of fixed cutter 7.

Thus with the movable cutter in the position indicated in FIG. 1 a bundle of wires is inserted in overlaying relation to the cutting edge 7A and into the collector 7. Thereafter the arm 13 is swung downwardly and the wires are severed, the severed ends being accumulated in collector 25. Another cutting operation can then be performed while the initial bundle of wires previously cut is retained within the collector 25. Thus several cutting operations can be performed before emptying the collector 25. In this way the wires which have been cut are prevented from flying in random directions so as to avoid possible injury to the operator or to others and are securely retained in substantially parallel relationship and in readily usable condition when removed in a single operation from collector 25.

In accordance with another feature of the invention, means are provided for readily determining the length of wires which are cut. Such measuring means may comprise a hollow tubular abutment means such as is designated in the drawings by the numeral 29. As can best be seen in FIG. 3 the abutment means 29 comprises a tubular element having a transversely disposed abutment 30 formed in the end of the abutment means 29 and the abutment 29 is mounted in telescopic relation within the collector means 25. From FIG. 3 it can be seen that collector means 25 is provided with positioning means in the form of a shoulder 31 which determines the innermost limit of travel of the abutment means 29. Thus the positioning means 31 and the length of the abutment means 29 determine the length of wire cut. If desired a number of abutment sleeves 29 of different lengths may be used so as to provide for cutting a variety of different lengths of wire. Alternatively, if desired, a single abutment means 29 may be used and its position relative to the collector 25 may be adjusted in frictional or other relation so as to vary the length of wires to be cut.

From the description above it will be understood that when a bundle of wires is inserted between the cutters 7 and 8 and into the collector 5 the innermost limit of travel is reached when the ends of the strands of wire engage the abutment surface 30. Furthermore, it is obvious that the position of abutment surface 30 relative to collector 25 determines the length of wire to be cut.

It is also apparent that by the invention the cutting of wires into desired lengths is greatly facilitated due to the fact that a number of wires may be severed in the same operation and at the same time their lengths automatically determined and the severed wires accumulated and maintained in a readily usable arrangement. Furthermore, items to be cut may be of different sizes and of different cross-sectional configuration and may be cut simultaneously.

While I have shown and described particular embodiments of the invention, I do not wish to be limited thereto and intend in the appended claim to cover all such changes and modifications as fall within the true spirit and scope of the invention.

What I claim as new and desire to secure by Letters Patent of the United States is:

A wire cutting device for simultaneously measuring, cutting and accumulating a plurality of straight strands of wire, said device comprising a support base, a fixed cutter element mounted on said base, an indented cutting surface of a length several times the diameter of the wires to be cut and formed on the edge of said fixed cutter element remote from said base, a pair of brackets having oversize holes therein for receiving mounting bolts whereby said brackets are adjustably mounted on said base, a movable cutter element pivotally supported by said brackets and movable alongside said indented cutting surface of said fixed cutter in shearing relation, a guide elements secured to said base and disposed generally alongside the plane of movement of said movable cutter element and on the side thereof opposite from said fixed cutter element, said guide element having a guiding surface disposed at a slight angle to the plane of movement of said movable cutter element whereby collision therebetween is avoided and whereby a gentle and positive guiding action of said movable cutter is effected to insure that movement of said movable cutter alongside said fixed cutter is sufficiently close to effect positive and efficient cutting, said guide element being provided with a plurality of oversized holes for receiving mounting bolts whereby said guide element is adjustably mounted on said base, collector means on said base adjacent said fixed cutter element, said collector means being of hollow tubular configuration with its axis disposed in a direction generaly normal to the direction of movement of said movable cutter element and having an internal diameter somewhat greater than the length of said cutting edge to render said collector effective to receive and to retain the wires cut during a plurality of cutting operations, and hollow tubular abutment means slidably mounted within said collector means in adjustable telescopic relation and having a transverse abutment surface therein for engaging the ends of wires inserted into said collector means from the end thereof adjacent said cutter elements so as to determine the length of wires to be cut.

References Cited in the file of this patent

UNITED STATES PATENTS

| | | |
|---|---|---|
| 938,741 | Campbell | Nov. 2, 1909 |
| 1,058,134 | Zane | Apr. 8, 1913 |
| 1,067,688 | Shirey | July 15, 1913 |
| 1,081,974 | Lintner | Dec. 23, 1913 |
| 1,116,752 | Stolk | Nov. 10, 1914 |
| 1,137,093 | Simonsen | Apr. 27, 1915 |
| 1,162,879 | Rauscher et al. | Dec. 7, 1915 |
| 1,506,273 | Smith | Aug. 26, 1924 |
| 2,087,124 | Smith et al. | July 13, 1937 |

FOREIGN PATENTS

| | | |
|---|---|---|
| 348,581 | Germany | Feb. 11, 1922 |